United States Patent Office 3,393,286
Patented July 16, 1968

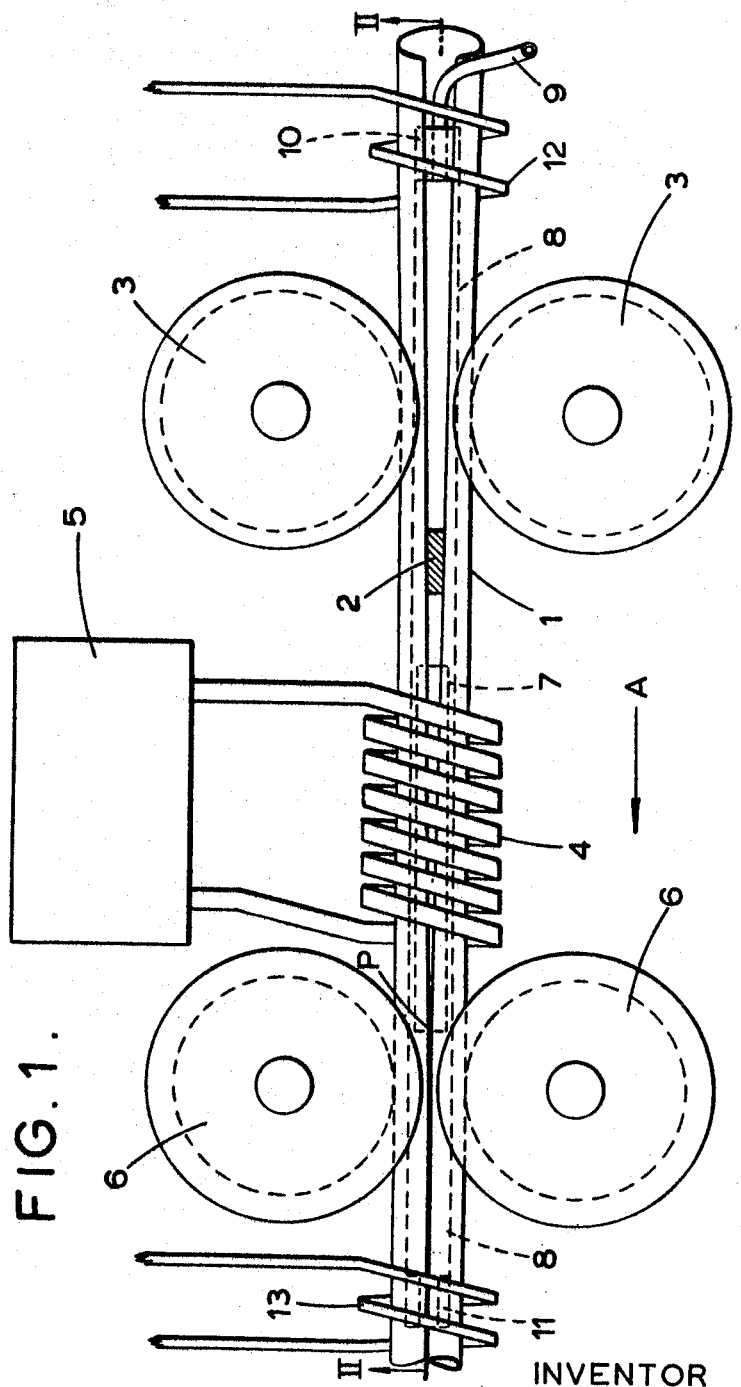

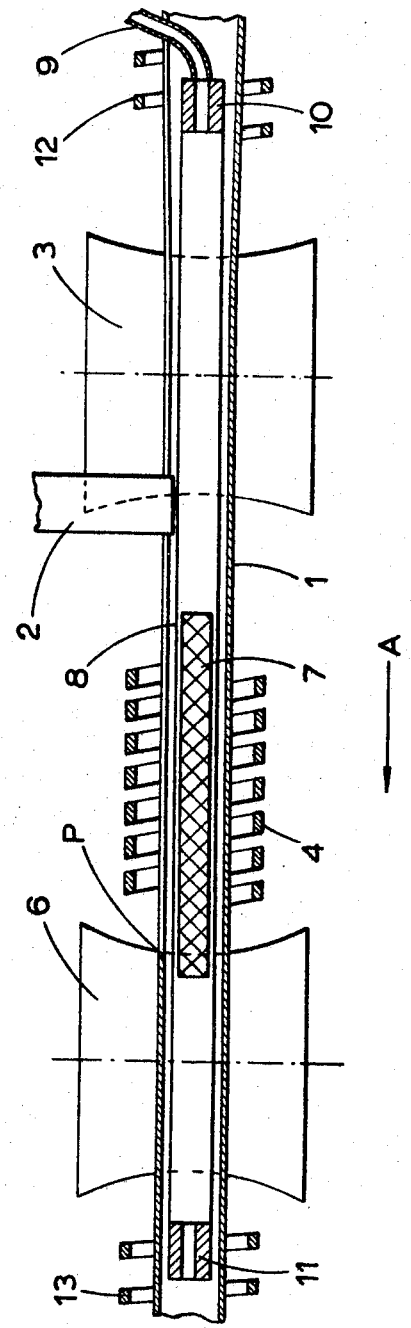

3,393,286
INDUCTION TUBE WELDER WITH IMPEDOR
Klaas Anne Zandstra, Bromley, England, assignor to Intertherm Limited, London, England, a British company
Filed Dec. 10, 1964, Ser. No. 417,404
Claims priority, application Great Britain, Dec. 16, 1963, 49,585/63
6 Claims. (Cl. 219—8.5)

ABSTRACT OF THE DISCLOSURE

A high frequency induction welder utilizes an impedor assembly for concentrating the current about the weld. The impedor assembly comprises a ferrite core in an insulating tube with magnetizable end pieces and a channel for conducting a cooling fluid. Induction coils are placed about the tube form to be welded in the region of the end pieces such that the impedor assembly is supported within the tube form by virtue of the magnetic field produced by the coils.

This invention relates to electric welding apparatus for tubes, pipes and the like in which the apparatus is of the type utilizing high-frequency energy and includes a high-impedance core arranged to be coaxially placed within the tube, pipe or the like to localize the heating effect of the high-frequency energy.

This invention finds particular application to the forming of small-bore tubes, pipes or the like having an internal bore of less than half-an-inch at their point of minimum cross-section, although its application is not limited to such tubes.

Welded circular tubes are usually formed from a strip material by a roll forming process in which a strip of material may be first passed through shearing rollers which trim the edges of the strip to the correct size; the strip is then passed through a series of forming stages, each stage comprising a set of polished rollers having a set radius of curvature. The radius of curvature of successive stages is smaller than that of previous stages. The strip edges are held apart by a knife positioned after the last forming rollers and before the welding stage.

The tube passes into the welding stage where the edges of the tube are welded together, and then through a final pair of pinch rollers which hold the welded edges of the tube together while the weld hardens, before passing the tube out of the welding stage for scarfing and further drawing, if necessary before cutting up into lengths for storage.

At the welding stage the tube is subjected to high-frequency energy and, in a preferred embodiment, passes through an induction heating coil which can be considered as a primary coil of a transformer. The tube is welded by the current induced therein, and can be considered as a single short-circuited secondary coil of a transformer. To localize and concentrate the heating effect of the coil it is necessary to introduce a core or impedance into the coil. This core is preferably made of a ferrite material known per se.

It will be appreciated that the locating and correct positioning of the core in the tube relative to the welding coil presents some difficulty. In large-bore tubes this difficulty has been overcome by placing a rod or rings of ferrite or the like in a capsule of insulating material such as polytetrafluoroethylene or other polymer, or in a cage and mechanically maintaining the capsule or cage in the correct position by means of holding it against the flow of a coolant material such as water-soluble oil. The coolant is passed along the bore of the formed tube from a point past the final pinching rollers in the direction of movement of the tube being formed. This oil is used for cooling the tube after welding. In order to prevent the capsule or cage from moving away from the welding stage with the coolant, it is anchored by a line at one end secured to a point adjacent to the point where the coolant enters the tube, so that the effect is similar to a boat moored at one end in a flowing stream.

This means of locating and positioning the core or impedance is satisfactory for large-bore tubes, but cannot be used for small-bore tubes since there is insufficient room in the bore for both the capsule or cage and the ferrite or the like. Consequently it has hitherto been the practice to insert the ferrite alone in the tube without any container in the flow of coolant as described above. However, ferrite, being a very brittle substance, may easily crack and break and if an insulating tube enclosing the ferrite is not provided the pieces which break off will be carried along the tube on the flow of coolant and out of the heating zone. Recovery of the pieces can be a lengthy and tedious business. The knife edge extends into the bore of the tube and is generally carried by a shoe which is positioned before the coil and the final pinch rollers. The knife is provided to prevent the edges abutting prematurely which might cause welding to take place at the wrong place.

In other forms of welding apparatus it is not desired to have a coolant flowing through the tube itself, and after welding the tube is cooled by passing it through a cooling jacket. In such a case there does not arise the difficulty that the core fragments will be washed away by the coolant. However, if fracture of the core does occur the pieces which break off will fall onto the bottom of the tube and will move away from the welding position as the welded tube passes through the welding apparatus.

In other cases where the tube, pipe or the like being welded is of a sufficiently large internal bore to allow the impedance core to be encapsulated it is not easy for the core to be correctly positioned relative to the heating apparatus since physical access to the inside of the tube near the welding point is very limited. This is so because the edges of the tube, pipe or the like are nearly in butting engagement.

It is thus desirable to provide means for adjusting the position of the core without necessitating physical contact of the core from outside the tube, and it is one object of the present invention to provide such means.

It is another object of the present invention to provide an electric welding apparatus in which an unencapsulated core can be retained in position should the core fracture, and which prevents the pieces of the core from moving from the welding position.

It is a further object that the core should be readily able to be removed from the apparatus when necessary.

The present invention relates to electric welding apparatus for tubes, pipes and the like, of the type utilizing high-frequency energy and including a high-impedance core arranged to be coaxially placed within the tube, pipe or the like. According to the invention, the core is provided at opposite ends with an end piece of magnetizable material, and magnetic means are provided in the apparatus in such a position as to influence the end pieces.

The end pieces may be attached to the end of the core or may be allowed to butt against the ends, or may be spaced therefrom by non-magnetic spacers. The magnetic means are preferably coils through which an electric current is passed and which have a magnetic field embracing the end pieces. It is desirable that the coils constituting the magnetic means should be movably mounted so that movement of the coils brings about a corresponding movement of the end pieces.

Other objects and advantages of the invention will be appreciated and more fully understood with reference to the following detailed description, when considered with the accompanying drawings, wherein:

FIG. 1 shows the final closing stage and welding stage of a small-bore tube forming machine according to the present invention; and FIG. 2 shows a vertical cross section on the line II—II of FIG. 1.

Referring now to the drawings, in this example of a high-frequency electric welding apparatus the tube is continuously formed on a tube forming machine from strip aluminum by pulling the strip through a series of stages of polished forming rollers, each stage having a successively smaller radius of roller to that of the previous stage. The edges of a strip 1 are held apart by a knife edge 2 after passing through final forming rollers 3. The knife edge 2 is inserted between the edges of the tube to prevent their meeting until the tube passes through a coil 4 which is supplied with high-frequency current from a radio-frequency generator 5.

Pinch rollers 6 are provided along the length of the tube after the coil 4 for applying pressure to the tube immediately after point P where the localized heating produces welding of the strip edges. The welding is produced by induced current flowing in the tube, caused by the current flowing in the coil 4, the tube acting as the short-circuited secondary winding of a transformer. The welded tube is drawn from the pinch rollers 6 through a scarfing stage (not shown) and may be passed through a further drawing stage (not shown) before it is then cut into lengths for storage.

In order to cool the tube a water-soluble oil is introduced at a point during forming, and this coolant flows along the tube in a direction which is parallel with the direction of movement of the tubes through the apparatus, as shown by arrow A.

It is necessary to concentrate the heat produced at the welding stage in one part of the tube only, i.e. the point P, which is at any given time local to the welding stage. A ferrite-rod core 7 which is contained in a thin-walled insulating tube 8 (made, for example, from polytetrafluoroethylene or other suitable plastic material) is positioned in the tube before the continuous forming process starts. The tube 8 is located to lie substantially coaxially in the coil 4 of the welding apparatus. The external diameter of the ferrite rod is less than the internal diameter of the tube 8 so that a gap exists between the two, to enable a coolant to be injected into the end of the tube 8 by way of tube 9. The rod 7 is located in the tube 8 by spacers (not shown).

The tube 9 is attached to a steel end cap 10 which forms a closure at one end of the insulating tube 8. The other end of the tube 8 is similarly provided with a steel end cap 11 having a passage therethrough to allow the coolant to flow into the welded tube. The ferrite rod 7 is held in position in the tube 8 by means of flanges (not shown). Two coils 12, 13 are arranged around the tube, one on either side of the coil 4. Preferably the coil 12 is arranged before the final closure rollers 3 and coil 13 is arranged after the pinch rollers 6. The coils 12, 13 are mounted on slides so that they can be moved along the tube. The tube 8 is arranged concentrically within the coils 12, 13 and the end caps 10 and 11 are arranged adjacent to the coils 12 and 13, respectively. A D.C. electric current is passed through the coils 12 and 13 and the end caps 10 and 11 come under the influence of a magnetic field set up by these coils. The magnetic field is strong enough to maintain the end caps in the desired position within the tube when the coolant is passed through the tube.

Coolant is also inserted between the tube 8 and the strip 1, and the external diameter of the tube 8 is less than the internal diameter of the welded tube so as to allow coolant to flow freely between the welded tube and the tube 8 for removing material sputtered from the point P inside the tube. The coolant preferably used in this construction is a water-soluble oil. The drag caused by this coolant on the insulating tube and on the sputtered material formed inside the tube at the weld is counteracted by the magnetic field formed in the coils 12 and 13 acting upon the end caps 10 and 11. As the ferrite rod 7 is positioned between the end caps 10 and 11 it, too, is maintained in position during the welding operation.

If it is necessary to inspect the ferrite rod 7 at the end of a particular run, or should the ferrite rod 7 break at the end adjacent to the point P and so disturb the magnetic flux concentration, the rod 7 can be removed from the tube 8 by maintaining current in either the coils 12, 13 and traversing the operative coil along the tube to an open point where the insulating tube 8 containing the broken rod 7 can be removed. The tube 8 containing the broken ferrite rod might also be removed by removing the current from the coils 12 and 13, and by inserting a magnet into the bore of the tube, until it contacts with either the end cap 10 or 11, and then withdrawing the magnet and the tube 8.

It will be appreciated that the position of the ferrite rod 7 relative to the point P can be altered by adjustment of the position of the coils 12 and 13 relative to the coil 4. A permanent magnet could, of course, be used instead of the coils 12 and 13 to create the magnetic field which holds end caps 10 and 11 attached to the tube 8, which maintains the ferrite rod in position. It is preferable that the ferrite rod is of a length such that the end caps lie outside the influence of the heating coil.

If the internal diameter of the tube 1 were so small that the ferrite rod core 7 could not be contained in the tube 8, it could be made either of a longer length so that it extended over the whole distance between the end caps 10 and 11 or, preferably, it would be made of a length similar to that shown in the drawings and then spaced from the end caps 10, 11 by quartz rod spacers. This has the advantage that there is no risk of the magnetic fields set up by the coils 12, 13 causing saturation of the ferrite core. Because quartz rod has a smooth exterior surface, and material sputtered onto it will not stick and cause a build up of material.

In the example described, a non-ferrous tube was being welded. A ferrous tube can also be welded and the invention still employed although in this latter case a stronger magnetic field will be necessary.

The embodiment described dealt only with a small-bore tube. The invention can be applied to larger-bore tubes, i.e. those larger than ½ inch diameter, but in such cases it would be more economic to use a known method of positioning the impedance core.

Although an induction type of welding apparatus has been described, the invention is not limited to this type of apparatus and can be extended to any type of electric welding apparatus utilizing high-frequency energy and employing an impedance core. Thus, the invention can also be used in, for example, high-frequency resistance welding apparatus.

The invention is to be understood to include within its scope the case where the impedance core is made of a material which is itself magnetizable and hence also to be influenced by an external magnetic field.

The foregoing disclosure relates only to a preferred embodiment of the invention, which is intended to include all changes and modifications of the example described within the scope of the invention as set forth in the appended claims.

What is claimed is:

1. An electric welding apparatus of the type adapted to form metal tubing by welding the converging edges of an advancing pre-formed metal strip and utilizing high-frequency energy to produce the heating effect required for welding, comprising an assembly including a high-impedance core arranged to be placed longitudinally within said advancing pre-formed strip in a position in which one end of the core is close to the said converging edges for localizing said heating effect in the region of said converging edges, and means for maintaining said assembly with the core in said position, said assembly comprising at least one end-piece of magnetizable material disposed adjacent one end of said core, and said maintaining means comprising magnetic-field-producing means for providing a magnetic field to act upon said end-piece to maintain said assembly with the core in said position, and further comprising means for supporting said magnetic-field-producing means externally of said advancing pre-formed strip and in an operational position near to said end-piece.

2. An electric welding apparatus according to claim 1, wherein said assembly further comprises a second end-piece of magnetizable material, said end-pieces being disposed adjacent opposite ends of said core, and said maintaining means further comprises a second magnetic-field-producing means for providing a magnetic field to act upon said second end-piece to maintain said assembly with the core in said position, and means for supporting said second magnetic-field-producing means externally of said advancing pre-formed strip and in an operational position near to said second end-piece.

3. An electric welding apparatus according to claim 2, further comprising primary-coil means for utilizing said high-frequency energy to induce heating-effect currents in said advancing pre-formed metal strip in the region of said converging edges, said magnetic-field-producing means comprising further coils, separate from said primary-coil means and energizable by direct-current to produce said magnetic fields to act upon said end-pieces.

4. An electric welding apparatus according to claim 3, wherein said assembly comprises:
(a) a tube of insulating non-magnetic material,
(b) said end pieces, supported by said tube at opposite ends thereof
(c) said core, housed within said tube, and
(d) spacing means of non-magnetic material between each end of the core and the end-piece at the corresponding end of said tube, for spacing said end-pieces sufficiently from said core to prevent the magnetic fields produced by said further coils from causing saturation of said core.

5. An electric welding apparatus according to claim 4, wherein said core comprises a rod of ferrite material of external diameter less than the internal diameter of said tube, said end-pieces having passageways therethrough, and further comprising means for introducing a liquid coolant into said assembly through one of said end-pieces to flow over said core in the same direction as the direction of advancement of said pre-formed strip.

6. An electric welding apparatus according to claim 1, wherein said magnetic-field-producing means are movable longitudinally with respect to said advancing pre-formed strip to provide adjustment of the position of said core relative to said converging edges.

References Cited
UNITED STATES PATENTS 3,209,115   9/1965   Van Iperen _____ 219—59
3,248,512   4/1966   Sommer _____ 219—8.5

RICHARD M. WOOD, *Primary Examiner.*

ANTHONY BARTIS, *Examiner.*

J. G. SMITH, *Assistant Examiner.*